United States Patent
Ma et al.

[15] 3,666,141
[45] May 30, 1972

[54] METHOD AND APPARATUS FOR ITERATIVE CONTROL OF SHOT SIZE AND CUSHION SIZE

[72] Inventors: Carlton Y. Ma; Klaus Dold, both of Cincinnati, Ohio

[73] Assignee: Cincinnati Milacron Inc., Cincinnati, Ohio

[22] Filed: May 25, 1970

[21] Appl. No.: 40,093

[52] U.S. Cl.................................222/1, 18/30 CS, 18/30 SS, 222/63, 222/389, 318/661
[51] Int. Cl. .........................................................B29f 1/02
[58] Field of Search ..................222/63, 1, 334, 389; 73/250; 18/30 CK, 30 CM, 30 CS, 30 CR, 30 CV, 30 SM, 30 SP, 30 SQ, 30 SR, 30 SS, 16 C; 128/218 A, DIG. 1; 318/661

[56] References Cited

UNITED STATES PATENTS

| | | | |
|---|---|---|---|
| 3,044,389 | 7/1962 | Rexford | 18/16 C |
| 3,278,992 | 10/1966 | Strauss | 18/30 CS |
| 3,359,601 | 12/1967 | Evans | 18/30 SS |
| 3,317,962 | 5/1967 | Morse | 18/30 SS |

FOREIGN PATENTS OR APPLICATIONS

| | | | |
|---|---|---|---|
| 1,110,534 | 4/1968 | Great Britain | 18/30 CR |

*Primary Examiner*—Robert B. Reeves
*Assistant Examiner*—David A. Scherbel
*Attorney*—Howard T. Keiser and Alfred J. Mangels

[57] ABSTRACT

Apparatus and method for controlling the axial movement of a ram member inside a barrel within which fluent material is processed and subsequently discharged from one end thereof by the ram member. Both the length of the stroke of the ram member and the end point of its path of travel are controlled to maintain a uniform volume of material discharged from the barrel during each stroke of the ram member after the apparatus has reached a substantially steady state condition. In the course of startup of the machine, the control system automatically adjusts the stroke of the ram member during the initial operating cycles to achieve a predetermined end point in its path of travel and to provide the necessary shot size.

12 Claims, 4 Drawing Figures

INVENTORS
KLAUS DOLD
CARLTON Y. MA

3,666,141

METHOD AND APPARATUS FOR ITERATIVE CONTROL OF SHOT SIZE AND CUSHION SIZE

BACKGROUND OF THE INVENTION

This invention relates to injection molding machines and more particularly to a control system for controlling the length of stroke and end point of the stroke of the ram member of an injection molding machine.

In injection molding machines, pelletized, granulated, or powdered plastic is normally fed into an elongated barrel at one end thereof. The barrel includes a rotatable and translatable screw therein to mix and soften the plastic, with or without externally applied heat, until the plastic reaches a viscous, coherent, flowable state, after which it can be injected into a closed cavity to form the desired part upon cooling. In the course of transforming the plastic into a viscous, coherent, flowable mass, the screw is caused to rotate within the barrel and thereby heat the plastic by physically working it. While it softens or plasticates the material, the screw also propels it axially within the barrel toward the end through which the injection occurs. As the volume of the plasticated material builds up in front of the screw, it gradually forces the screw rearwardly until a predetermined point at which the rotation of the screw is stopped. At that point the screw is driven forwardly, by hydraulic pressure or otherwise, to force the plasticated material through an orifice at the end of the barrel and into the mold cavity.

In the past, during the initial start-up of such an injection molding machine, the length of the stroke of the screw was adjusted manually by shifting the positions of a limit switch. The limit switch defined one of the end points of the injection stroke of the screw since the length of the injection stroke is related to the volume of the mold cavity into which the injected material is forced. The limit switch stopped the motor that rotated the screw to conclude the plastication phase of the cycle; a timer provided a signal which started the motor again to reinstate plastication after the previously plasticated material had been injected into the mold. Whenever the mold was changed it was necessary to manually readjust the position of the limit switch to compensate for the differences in mold volume. That process involved a trial and error procedure and required considerable time until the proper stroke length was achieved and the limit switch could be set at the position to maintain that injection stroke.

Additionally, if the initial setup of the machine was made before the plastic material reached its equilibrium conditions, it would be possible that an adjustment of the stroke length would later have to be made when the equilibrium conditions were achieved. This resulted from the fact that differences in temperature of the plastic material resulted in different densities and thus corrections would have to be made in the length of the injection stroke to compensate for those density changes.

It is an object of the present invention to obviate the above-described difficulties.

SUMMARY OF THE INVENTION

Briefly stated, in accordance with one aspect of the present invention, a method and apparatus are provided for controlling the translation of a ram member inside a barrel within which fluent material is processed and thereafter discharged therefrom by the ram. The apparatus comprises means for translating the ram member within the barrel and includes transducer means for sensing the axial position of the ram member. A control means is provided for comparing the axial position of the ram member with an input position and for generating an error signal based on the comparison. The error signal is utilized to correct the position of the ram member during the next succeeding injection stroke.

DESCRIPTION OF THE PREFERRED EMBODIMENTS

Figure 1:
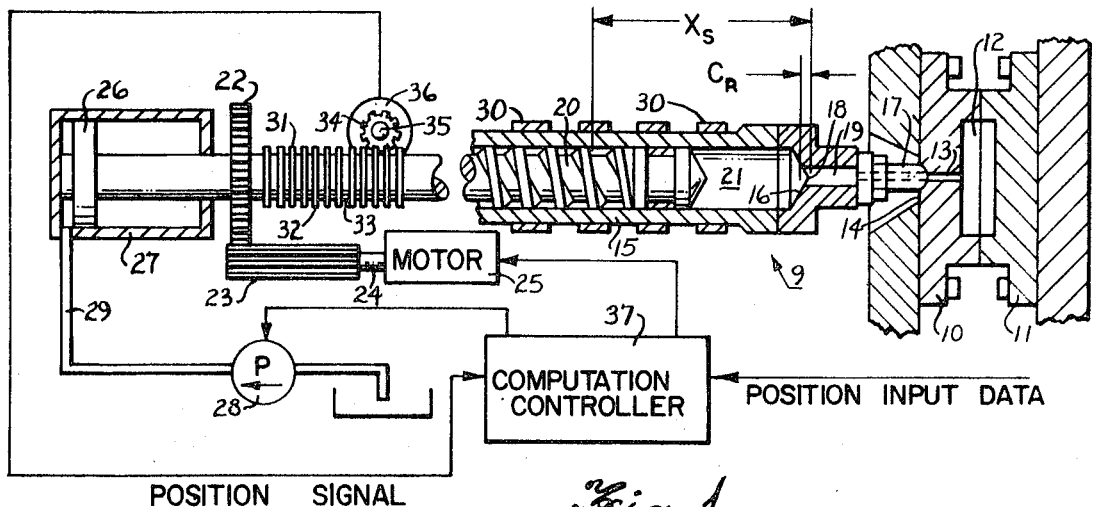
FIG. 1 is a schematic view showing the control system of the present invention as applied to the injection system of an injection molding machine.

Referring now to the drawing and particularly to FIG. 1 thereof, there is shown a portion of the injection system of an injection molding machine 9. Machine 9 includes a pair of mold members 10, 11 which cooperate when closed to define a mold cavity 12. A passageway 13 extends through mold member 10 from mold cavity 12 to a point on the rear surface 14 of mold member 10. A cylindrical barrel 15 which can have a frusto-conical surface at its inner end 16, includes a nozzle 17 which is positioned against rear face 14 of mold member 10 and includes an aperture 18 therein which provides communication with an intermediate passageway 19 in barrel 15 and passageway 13 in mold member 11, through nozzle 17.

Slideably positioned within barrel 15 is a ram member 20, the function of which is to force molten plastic from within the forward volume 21 of barrel 15 into mold cavity 12. As shown in FIG. 1, ram member 20 is a screw which comprises an elongated shaft having one or more flights or screw threads extending radially outwardly therefrom. The screw is both reciprocable and rotatable within barrel 15 and is driven by means of a gear 22 keyed thereto and which, in turn, is driven by a pinion 23 keyed to the drive shaft 24 of a motor 25. Pinion 23 is shown in elongated form so that it is in continuous engagement with gear 22 which, as hereinafter described in more detail, moves axially with ram member 20. Motor 25 can be either electrically or hydraulically operated, as desired. Although shown in terms of a rotatable and reciprocable screw, ram member 20 can be provided without screw threads on its outer periphery and can be adapted to tightly but slidably fit within barrel 15 to function solely as an injection ram. Attached to the distal end of ram member 20, is a piston 26, which is slidably positioned within a cylinder 27 to which a hydraulic pump 28 is connected by conduit 29 to provide the force for the injection stroke.

In the course of plasticizing the material prior to injection, ram member 20 shown in FIG. 1 rotates, thus carrying plastic material from an upstream end of the screw portion (not shown) toward inner end 16 of barrel 15. In so doing, the screw is forced rearwardly by the accumulating plasticized material since at this point in the cycle intermediate passageway 19 is closed by means of a valve (not shown) which can be a nozzle shut-off valve such as that disclosed and claimed in U.S. Pat. 3,500,501, which issued Mar. 17, 1970, to O. R. Johansson. Thus, the plastic material is confined in forward volume 21 causing the screw to be retracted rearwardly within barrel 15. After the screw has progressed rearwardly the required distance, the rotation of the screw can be stopped by stopping motor 25 and then hydraulic pressure can be applied to the rear face of piston 26 while opening the shut-off valve (not shown), thus permitting the screw to function as a ram and to thereby inject the plasticized material from forward volume 21 of barrel 15 through passageways 19, 13, respectively, and into mold cavity 12.

Hydraulic pressure can be maintained on piston 26 and thus also on the injected material, until such time as the latter has solidified sufficiently that withdrawal of the screw and consequent reduction of the pressure will not cause the previously plasticized material to flow back through passageway 13, 19, respectively, into forward volume 21 of barrel 15. During the time solidification is taking place, the material that remains in barrel 15 can be maintained in a fluid state by means of external heating devices, such as, for example, band heaters 30. When the shut-off valve (not shown) is closed, motor 25 is energized thus causing the screw to rotate, and thereby repeating the plastication and injection cycle hereinabove described.

Ram member 20 includes notched portion 31 which comprises a plurality of spaced annular ridges 32 on its outer periphery. The spaces between adjacent ridges 32 are recessed to form grooves 33 and thus notched portion 31 includes a plurality of alternately spaced grooves and ridges. A gear wheel 34 is positioned on the shaft 35 of a transducer 36 and is in engagement with notched portion 31 of ram member 20. Transducer 36 provides a signal indicative of the instantaneous axial position of the ram member and can be, for example, a shaft angle encoder, a resolver, or any other device which is capable of providing a signal which indicates the axial position of the ram member. Transducer 36 can provide a signal comprising a series of electrical pulses the number of which is proportional to the axial position of ram member 20. For example, if transducer 36 is a shaft angle encoder its output will be a series of electrical pulses, if transducer 36 is a resolver, the sinusoidally varying output signal must be passed through a converter, such as a Schmitt trigger, to transform the sinusoidal signal into a series of pulses, as is well known by those skilled in the art.

The output signal from transducer 36 is provided to a controller 37 which compares the position of ram member 20 at any instant with the position input data. Controller 37 preferably includes one or more counters to receive and count the pulses which emanate from transducer 36. In addition to the counting function, controller 37 also is capable of simple arithmetic computation and is, therefore, referred to as a computation controller. The counted pulses are compared by controller 37 with input data, which can be introduced, for example, by means of rotary thumbwheel decoding switches such as these called "Digiswitch", distributed by The Digitron Co., Pasadena, Calif. The position input data are the forwardmost end point of the stroke of ram member 20, designated $C_R$ in FIG. 1, and also an initial estimate of the rearmost end point of the stroke of ram member 20 ($X_s$ in FIG. 1), which initial estimate will hereinafter be referred to as $X_{so}$.

In the steady-state condition, after the material has been plasticated and the screw has been forced rearwardly to position $X_s$ by the accumulated plasticated material in forward volume 21, motor 25, which rotates the screw, is stopped and a signal is provided by controller 37 to a motor (not shown) which drives hydraulic pump 28 to cause hydraulic pressure to be applied to the rear face of piston 26, thereby causing ram member 20 to move toward mold members 10, 11 to force the plasticized material in forward volume 21 to be injected into mold cavity 12. When the forward motion of ram member 20 has stopped, by virtue of mold cavity 12 having been filled, controller 37 compares the actual position of the ram member 20 with the desired final position $C_R$ and generates a suitable error signal to correct the rearmost end point position $X_s$ of ram member 20 on subsequent injection strokes, as will hereinafter be described in greater detail. Thus, controller 37 is of a computation type which compares an input value with a generated signal and, based on that comparison, computes an error signal which it utilizes to control the next succeeding cycle of the machine. The functions controlled by controller 37 are the operation of motor 25, thereby controlling the rotation of the screw, and the operation of hydraulic pump 28, which provides the pressure required to inject the plasticized material into mold cavity 12.

The desirability of maintaining a space $C_R$ at the end of the axial travel of ram member 20 is influenced by the fact that if the ram member were permitted to contact inner end 16 of barrel 15, or "bottom out" in its axial movement, there would be no control over the pressure of the plasticized material within the mold after injection, sometimes referred to as the "packing pressure," and thus it would be difficult, if not impossible, to assure that the mold was completely filled after each injection stroke. Therefore, a so-called "cushion," which is the $C_R$ distance, is provided to assure that the mold is filled and that pressure is maintained on the material within the mold until solidification of the plastic material has proceeded to the point where the pressure can be removed.

Figure 2:
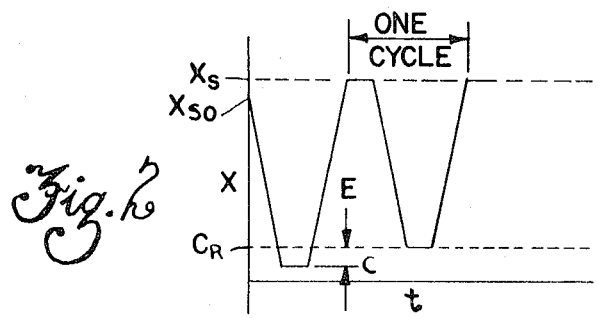
FIG. 2 is a graph showing the position of the ram member as a function of time for the case where the starting point of the injection stroke is further forward than it should have been.

In operation, the desired cushion distance $C_R$ and estimated retraction distance $X_{so}$ are the input quantities for the controller and are set by the operator. If the estimated retraction distance $X_{so}$ is slightly less than the actual retraction distance necessary to provide a shot size ($X_s - C_R$) to fill the mold, then upon the forward stroke of ram member 20 the latter would terminate at a point C as shown in FIG. 2, between the inner end 16 of barrel 15 and the desired cushion distance $C_R$. Controller 37 would compare the actual value C with the desired value $C_R$ by subtracting C from $C_R$ to provide an error signal E, which is added to the estimated shot size $X_{so}$ to provide the shot size for the next cycle. In this particular case, the error signal would be sufficient to cause ram member 20 to retract sufficiently during the next cycle to provide the necessary shot size to fill the mold and to stop at the desired cushion distance $C_R$.

Figure 3:
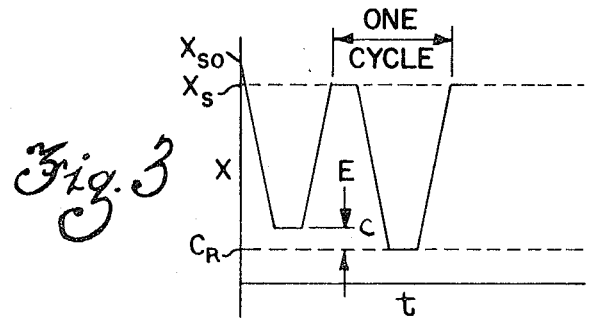
FIG. 3 is a graph showing the positioning of the ram member as a function of time for the case where the starting point of the injection stroke is further rearward than it should have been.

If the initially selected retraction distance $X_{so}$ is too large, the situation shown in FIG. 3 would result. In this case, the end point of the forward travel of ram member 20 would be at a position C which is greater than $C_R$. Thus, the error signal E, which is the arithmetic difference between C and $C_R$, would be a negative quantity since C is greater than $C_R$ and, therefore, E would be subtracted from the $X_{so}$ to provide the next shot size, which, again, will be the necessary shot size to fill the mold and will cause ram member 20 to stop at the desired cushion distance $C_R$.

Figure 4:
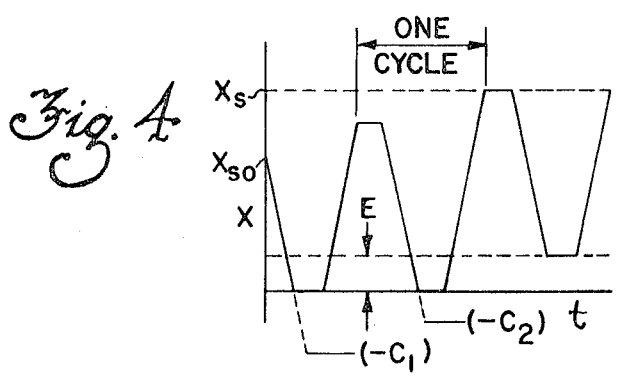
FIG. 4 is a graph of the position of the ram member as a function of time for the case where the starting point of the injection stroke is considerably more forward than it should have been and shows the corrections which the control system of the present invention provides on subsequent strokes.

If, however, the initially selected retraction distance $X_{so}$ provides a shot size which is considerably less than the actual shot size dictated by the mold volume, the situation shown in FIG. 4 would result. In this case, ram member 20 travels forward until it contacts inner end 16 of barrel 15. Since it is physically impossible to move it further, it would not be able to travel to a position to fill the mold, which would be position $-C_1$ shown in FIG. 4, and thus the error that controller 37 would compute would be $C_R$ since the C value that transducer 36 would indicate would be 0. At this point, the value $C_R$ could be added to $X_{so}$ and thus by successive iterations using $C_R$ as the error value E, the proper shot size and cushion distance can be obtained. However, to speed the iterative process it is desirable, particularly when $C_R$ is considerably smaller than $X_s$, to provide a multiplier for the $C_R$, which can be any value that is convenient. For example, the value 3 can be chosen, in which case the error signal would be 3 $C_R$, which would reduce the number of iterations necessary to achieve the desired shot size and cushion distance.

It can thus be seen that the present invention provides an improved method and apparatus for automatically and quickly setting up an injection molding machine for the desired shot size and cushion distance, and also for automatically controlling those values during the course of subsequent molding operations so that any slight deviation therefrom is quickly corrected.

While particular embodiments of the invention have been illustrated and described, it will be apparent to those skilled in the art that various changes and modifications can be made without departing from the spirit and scope of the invention, and it is intended to cover in the appended claims all such changes and modifications that are within the scope of this invention.

What is claimed is:

1. Apparatus for controlling the translation of a ram member inside a barrel within which fluent material is processed and thereafter discharged from one end thereof by said ram, said apparatus comprising:
   a. means for translating said ram member within said barrel;
   b. transducer means for sensing the instantaneous axial position of said ram member and providing an electrical signal proportional thereto;

c. control means for comparing the final axial position of said ram member with an input position value and for generating an error signal dependent upon the difference between said final axial position and said input position value; and
d. means responsive to said error signal to control the initial position of said ram member during the next succeeding stroke thereof.

2. The apparatus of claim 1 wherein said transducer means comprises a shaft angle encoder.

3. The apparatus of claim 1 wherein said transducer means comprises a resolver.

4. The apparatus of claim 1 wherein said control means is a computation controller of the digital type.

5. Apparatus for controlling the translation of a ram member inside a barrel within which fluent material is processed and thereafter discharged therefrom by said ram, said apparatus comprising:
a. means for translating said ram member from a first position to a second position to cause the material within said barrel to be discharged through an end thereof;
b. transducer means for sensing the axial position of said ram member and generating an electrical signal proportional thereto;
c. means for setting a desired axial position of said ram;
d. control means for comparing the axial position of said ram member with an input position and for generating an error signal proportional to the difference between said ram member position and said input position; and
e. means responsive to said error signal to retract said ram member to a new first position during the next succeeding cycle thereof.

6. The apparatus of claim 5 wherein said transducer means comprises a position resolver.

7. The apparatus of claim 6 wherein said control means comprises a computation controller of the digital type.

8. A method of controlling the axial translation of a ram member positioned in an elongated barrel within which fluent material is processed and thereafter discharged from said barrel by said ram, said method providing a series of substantially uniform volumes of said processed fluent material for each forward stroke of said ram during steady state conditions, said method comprising:
a. converting the axial position of said ram member into an electrical signal;
b. comparing said electrical signal with an input position;
c. generating an error signal related to the difference between said ram position signal and said input signal; and
d. correcting the position of said ram member during the next succeeding cycle by an amount determined by said error signal.

9. The method of claim 8 wherein said correcting step comprises varying the extreme positions of said ram member during the next succeeding cycle along its path of travel in response to said error signal.

10. The method of claim 8 wherein said error signal is multiple of the distance from the discharge end of said barrel to the desired terminal position of said ram member.

11. The method of claim 8 wherein said error signal is proportional to the arithmetic difference between the desired terminal position of said ram member and the actual terminal position of said ram member.

12. The method of claim 8 wherein said correcting step comprises altering the distal position of said ram member during the next succeeding cycle by an amount corresponding the error signal generated during the preceeding cycle.

* * * * *